(12) United States Patent
Koike

(10) Patent No.: US 6,778,814 B2
(45) Date of Patent: Aug. 17, 2004

(54) WIRELESS MICROPHONE APPARATUS AND TRANSMITTER DEVICE FOR A WIRELESS MICROPHONE

(75) Inventor: Yukinaga Koike, Nagano (JP)

(73) Assignee: Circuit Design, Inc., Nagano (JP)

(*) Notice: Subject to any disclaimer, the term of this patent is extended or adjusted under 35 U.S.C. 154(b) by 684 days.

(21) Appl. No.: 09/746,338

(22) Filed: Dec. 20, 2000

(65) Prior Publication Data

US 2001/0034214 A1 Oct. 25, 2001

(30) Foreign Application Priority Data

Dec. 28, 1999 (JP) ............................................. 11-374282

(51) Int. Cl.[7] ................................................. H04B 1/02
(52) U.S. Cl. ........................ 455/95; 455/127.1; 381/92
(58) Field of Search .............................. 455/72, 91, 95, 455/127.1; 381/26, 91, 92, 122; 389/362, 381

(56) References Cited

U.S. PATENT DOCUMENTS

| | | | | |
|---|---|---|---|---|
| 3,718,862 A | * | 2/1973 | Norris | ........................ 455/95 |
| 5,523,722 A | * | 6/1996 | Nakano et al. | ......... 331/107 A |
| 5,666,659 A | * | 9/1997 | Kernahan et al. | ............. 455/43 |
| 5,758,268 A | * | 5/1998 | Murakami et al. | ........ 455/114.1 |
| 6,038,430 A | * | 3/2000 | Thomson et al. | ............. 455/72 |
| 6,201,876 B1 | * | 3/2001 | Niemi et al. | ................. 381/355 |
| 6,246,864 B1 | * | 6/2001 | Koike | ......................... 455/110 |
| 6,267,600 B1 | * | 7/2001 | Song | ...................... 434/307 A |

* cited by examiner

Primary Examiner—Nguyen T. Vo
Assistant Examiner—Nhan T. Le
(74) Attorney, Agent, or Firm—Townsend and Townsend and Crew LLP

(57) ABSTRACT

A compact and lightweight wireless microphone and transmitter. The transmitter is connected to the microphone using a standard connector. The transmitter includes a low-frequency amplifier for amplifying a received voice signal and a surface acoustic wave oscillator providing a high-frequency oscillation signal. A modulator combines the amplified voice signal and the high frequency oscillation signal into a modulated signal. The modulated signal is amplified using a high-frequency amplifier to create a high-frequency modulated signal. The high-frequency modulated signal is output as radio waves through an antenna. A power supply is included for powering the transmitter. To improve sound quality, the transmitter additionally includes a compander circuit for improving signal-to-noise ratio and increasing a dynamic range through a logarithmic compression algorithm. Also, a pre-emphasis circuit which reduces noise by providing higher gain in the high frequency amplification than in the low frequency amplification.

21 Claims, 9 Drawing Sheets

To Fig. 3a

Block Diagram of Quartz Oscillation Method of
Wireless Microphone Transmitter

In the above example, 23 MHz of quartz oscillator is multiplied by 36 to generate 828 MHz.

WIRELESS MICROPHONE APPARATUS AND TRANSMITTER DEVICE FOR A WIRELESS MICROPHONE

BACKGROUND OF THE INVENTION

1. Field of the Invention

The present invention relates to a wireless microphone apparatus for performing frequency modulation (FM) of a voice signal for transmission as radio waves, and particularly to a transmitter device for FM wireless microphone with a band of about 800 MHz.

2. Description of the Related Art

Wireless microphone systems used in a concert halls, live stages or wayside recording are roughly classified into two types: (1) hand-held microphone transmitter systems and (2) belt pack microphone transmitter systems. Ultimately, the respective transmitter systems should be compact, lightweight and offer long term operation (about ten hours). However, it is difficult to achieve both size and weight reductions along with long-term operation because the transmitter systems are battery operated.

A hand-held transmitter apparatus typically has an integral structure of a microphone element, a window screen and a body case for receiving a battery. In addition, it is becoming desirable to be able to change certain components within a microphones in order to adapt it to differences in voice quantity, voice quality or preference of tone characteristics of a singer or a speaker.

Accordingly, it is desired to create a wireless microphone where the microphone is severable from the transmitter. However, this is complicated by the number of different circuits required to improve sound quality such as reducing signal-to-noise ratio or increasing dynamic range. Because of the large number of circuits, the body of the transmitter must be formed in a large size which is inconvenient and potentially interferes with the operation of the transmitter. Thus, conventional apparatus and circuits result in a microphone which is not optimal.

For example, in a conventional transmitter for a wireless microphone, a high-frequency oscillating part generally requires multiplying an output from a quartz oscillator to obtain a desired frequency. Such multiplication is done using a Phase Lock Loop (PLL) circuit and a conventional quartz multiplication method.

Such a conventional quartz multiplication method is illustrated in FIG. 7. The method involves multiplying a fundamental frequency of 23 MHz derived from a quartz crystal by 36 in order to obtain a desired frequency of 828 MHz related to a frequency band of 800 MHz. Such a multiplication method requires a circuit which consumes a significant physical mounting area. In part, the large surface area is due to intermediate filters required to reduce unnecessary radiation. In addition, in the case of an overtone oscillation type of the quartz oscillator, it is difficult if not impossible to perform deep modulation and oscillation with frequencies at or above 800 MHz. In part, this is due to the possibility of breaking the quartz oscillator which must be made very thin.

Alternatively, such conventional methods allow for frequencies that are easily changed. Such changes can be made by modifying circuit configuration. However, as illustrated in FIG. 8, such a circuit is complex. In addition to complexity, the circuit consumes significant power and thus requires larger or additional batteries. Thus, such conventional methods are not suited for miniature applications.

Accordingly, circuits and/or methods capable of miniaturization are desired. Further, it is desirable to provide a wireless microphone which provides for connection of a transmitter to a microphone through a standard connector, such as a canon connector (i.e. XLR).

SUMMARY OF THE INVENTION

The present invention provides a compact and lightweight wireless microphone for business. In addition, the present invention provides a transmitter for the microphone with a size compatible with a canon connector. In view of the aforementioned problems, it is an object of the present invention to provide a transmitter for a wireless microphone. The transmitter comprises a connector means for making connection to a microphone and inputting a voice signal from the microphone, a low-frequency amplification means for amplifying the voice signal, a surface acoustic wave (SAW) oscillation means for outputting a high-frequency oscillation signal, a modulation means for performing frequency modulation of the high-frequency oscillation signal by the amplified voice signal, a high-frequency amplification means for amplifying a high-frequency modulation signal, an antenna means for radiating a high-frequency output signal amplified by radio waves, and a power source for supplying electric power of a predetermined voltage to each of the aforementioned means.

To significantly improve sound quality required for business applications, the present transmitter device further comprises a compander circuit for improving a signal-to-noise ratio and for increasing a dynamic range by compressing the voice signal using logarithmic compression. In an embodiment, the compression is done using ½ logarithm compression. Beyond compression, a pre-emphasis circuit is included for reducing noise by providing a degree of amplification of high pass frequencies larger than the degree of amplification for other frequencies.

In some embodiments, the present invention comprises a SAW oscillation means which outputs a high-frequency oscillation signal with a band of about 800 MHz directly without multiplication.

The modulation means includes an oscillation element, a modulation and oscillation circuit, and a buffer amplification circuit. The voice signal is superimposed on a bias voltage at a variable capacitance diode at the modulation means. The voice signal is applied to the oscillation element and modulation is performed by changing a load of the SAW oscillation means. The SAW oscillation means is inserted into a terminal of the oscillation element.

The modulated signal is amplified using a high frequency amplification means. The amplified modulated signal has a power in an 800 MHz band of about +10 dBm. Additionally, an embodiment of the present invention provides for a band-pass filter circuit for eliminating harmonics of the high-frequency oscillation signal and for matching the impedance of the antenna means.

In part, the antenna means comprises the body case of the transmitter. The body case is about ¼ the wavelength of the high-frequency oscillation signal. In an embodiment, the body case is about 7.5 cm long with a diameter of 2.3 cm. In an embodiment, the power source means comprises a battery and a DC—DC converter for increasing an output voltage of 1.5 V DC of said battery to 3.0 V DC. In some embodiments, the converted voltage is stabilized to 2.7 V DC by a series regulator. Each the circuit means in the device is designed to operate at the same voltage. In an embodiment, the battery used is a single AAA dry battery offering 10 hours or longer of continuous operation. In part because of the battery, a weight of the present device including the metal receiving case and the battery is about 55 g.

In some embodiments, the SAW resonator is capable of directly oscillating at or about a frequency band of 800 MHz. To avoid frequency changes of the SAW resonator due to changes in ambient temperature, an embodiment includes a plurality of transistors connected in series to increase negative resistance and thus provide sufficient oscillation margin.

Moreover, in some embodiments, a high-frequency amplifier performs matching for an antenna and a band-pass filter reduces unnecessary radiation. Such a band pass filter is simple because the SAW resonator directly provides a frequency at or about 800 MHz.

The antenna means provides good radiation efficiency. In an embodiment, such antenna means are formed from a microphone body while a transmitter body forms a ground. Accordingly, a structure in which the antenna is not exposed outside of the structure is achieved.

DESCRIPTION OF THE PREFERRED EMBODIMENT

Details on a wireless microphone apparatus and a transmitter device for the apparatus according to the present invention will be described later with reference to the accompanying drawings.

Figure 1:
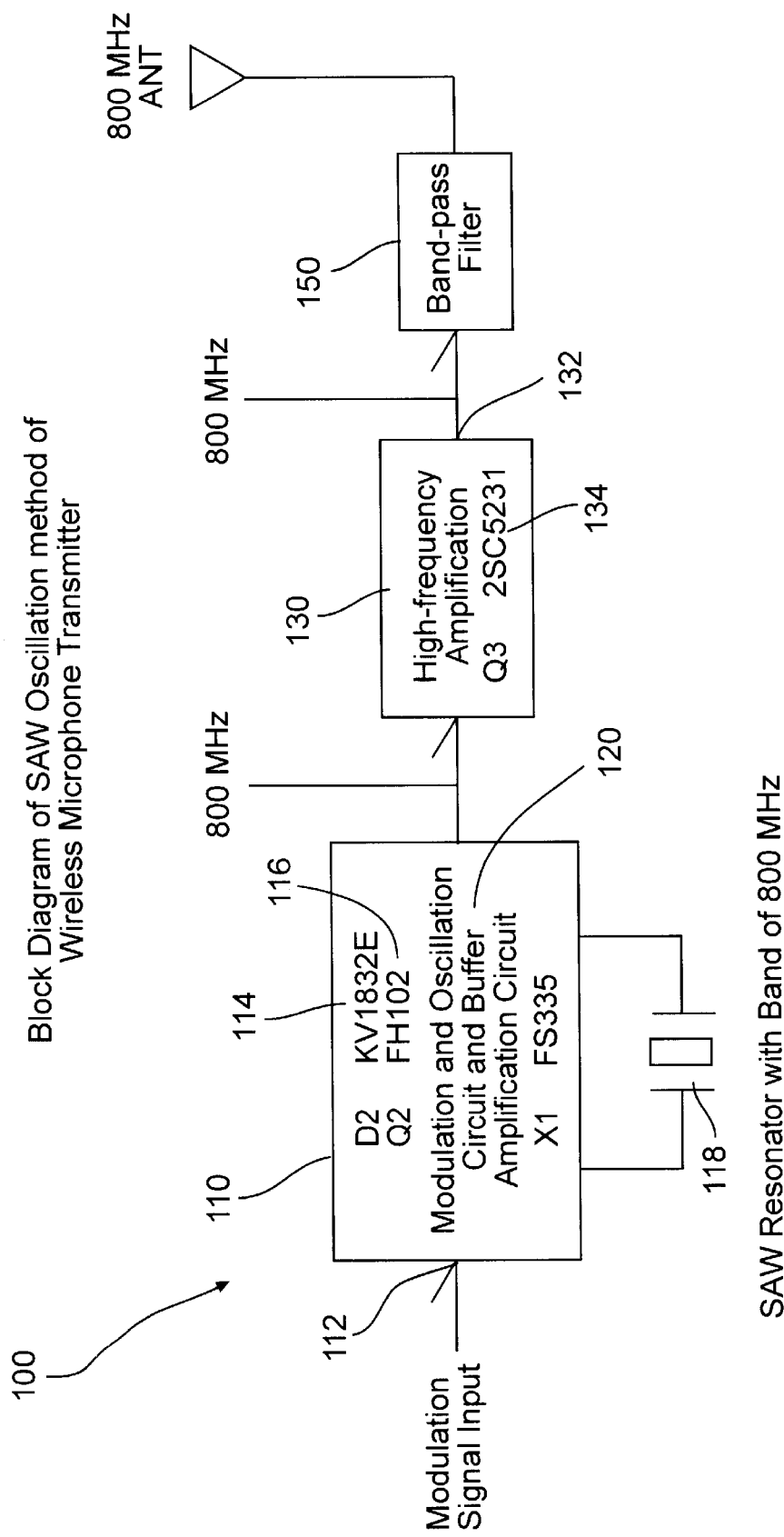
FIG. 1 shows a schematic block diagram illustrating an embodiment of a circuit configuration in a transmitter device for a wireless microphone according to the present invention.

FIG. 1 shows a schematic block diagram of an embodiment of a circuit configuration 100 according to the present invention. Referring to FIG. 1, circuit configuration 100 includes a modulation and oscillation circuit 110. In modulation and oscillation circuit 110, an AF signal from a modulation signal input terminal 112 along with a bias voltage is applied to a variable capacitance diode 114 (e.g., diode D2 which is a KV1832E). In addition, a load of a SAW resonator 118 with a band of 800 MHz is inserted into a base circuit of an oscillation element 116 (e.g., Q2 which is a FH102). In operation, the load is varied to perform FM modulation. In order to increase a negative resistance and stabilize oscillation in the SAW resonator 118, two transistors (e.g., FH102) are provided in series. In addition, modulation and oscillation circuit 110 includes a buffer amplification circuit 120 formed of transistors and included on the same package.

Circuit configuration 100 further includes a high-frequency amplification circuit 130. In high-frequency amplification circuit 130, about 0 dBm of electric power of a band of 800 MHz outputted from buffer amplification circuit 120 is amplified to +10 dBm of transmission power at the antenna end 132 by a high-frequency amplification element 134 (e.g., Q3 which is a 2SC5231).

Circuit configuration 100 further includes a band-pass filter 150 which is formed of two stages of π type low-pass filters. The π type low-pass filters act to attenuate any harmonics greater than two times 800 MHz. Band-pass filter 150 matches the impedance of an antenna circuit (not shown). In an embodiment, the antenna circuit includes a microphone body (not shown) and a body case of a transmitter (not shown). The impedance match does not include matching the attenuation of a harmonic noise component.

Figure 2:
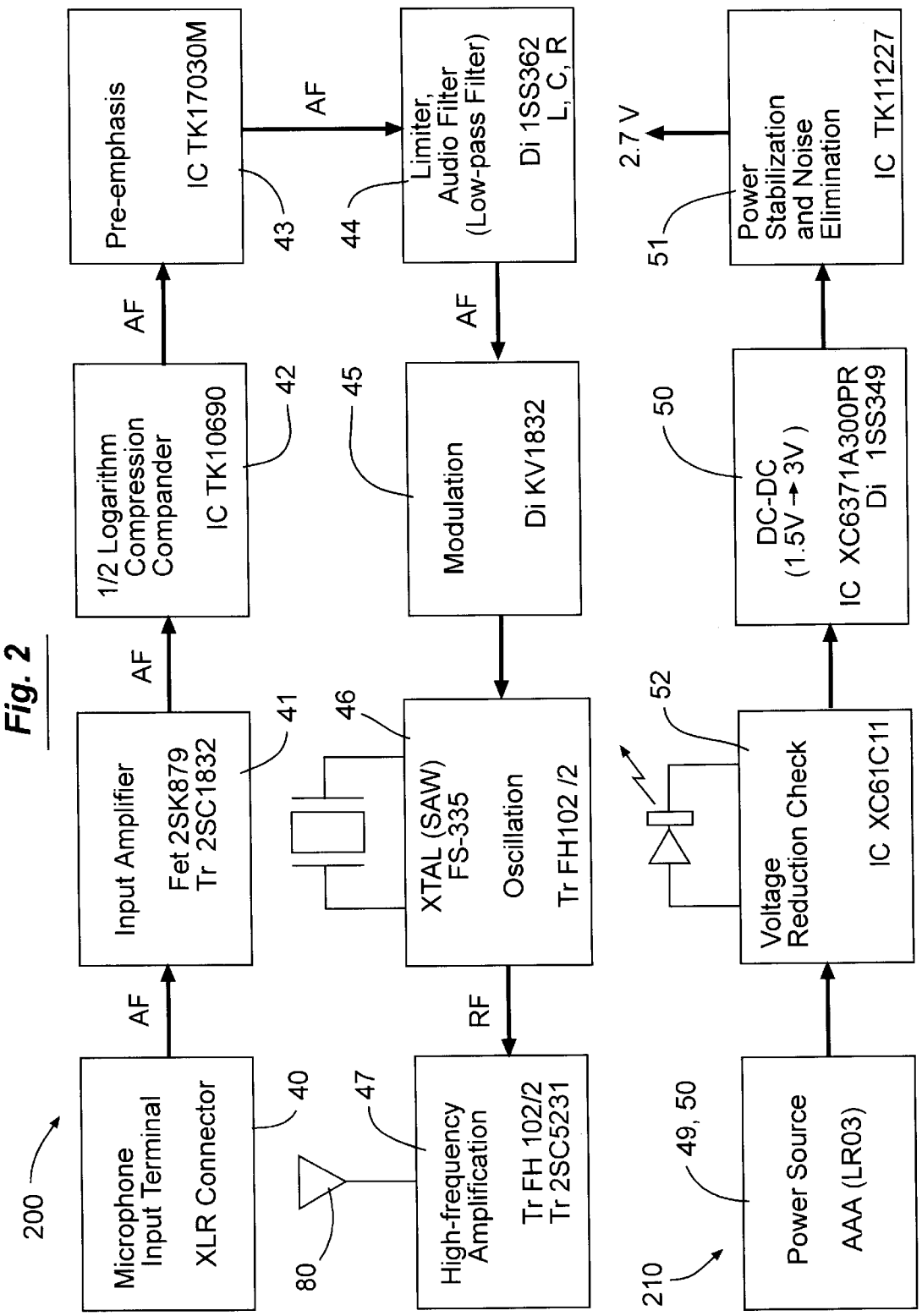
FIG. 2 shows a block diagram of a more detailed circuit configuration of an embodiment of the transmitter device for a wireless microphone according to the invention.

FIG. 2 shows a block diagram of a more detailed circuit configuration 200 of the transmitter according to the invention. Referring to FIG. 2, more detailed circuit configuration 200 includes a microphone input terminal 40 which comprises an industry-standard XLR connector for connecting the microphone to the transmitter. As a result of this, different transmitters can be attached to the microphone. The different transmitters can accommodate tone characteristics of different users, such as a singer or a speaker.

Input amplifier 41 provides for low-frequency amplification of a voice signal received from microphone input terminal 40. The amplification is performed to a predetermined level. The amplified voice signal is logarithmically compressed by a compander 42. In an embodiment, the compression is performed to ½ logarithm, however, it should be recognized that other compression ratios can be used. As a result of the amplification and compression, the dynamic range and signal-to-noise ratio characteristics of the wireless microphone are significantly improved.

A frequency of the logarithmically compressed voice signal is input to a pre-emphasis circuit 43 to improve sound quality. Sound quality is augmented for a high frequency region. Such augmentation raises a high frequency band of a voice signal to a higher level than other voice regions. Also, any hiss noise is reduced. Such a logarithmically compressed and pre-emphasized voice signal is subsequently de-emphasized and expanded when received in a receiver unit.

The pre-emphasized voice signal is processed through a low-pass audio filter 44 to reduce a high-pass noise. The signal emerging from low-pass audio filter 44 is modulated in block 45. The modulation creates an FM signal using SAW resonator oscillation 46 at a frequency band of 800 MHz. The signal is amplified using a high-frequency amplifier 47 and is transmitted through antenna 80.

Also illustrated in FIG. 2 is power source 210. Power source 210 includes a AAA dry battery 49 which provides power at 1.5V DC. The power level from battery 49 is monitored by a voltage reduction check 52. The voltage reduction check monitors decreases in the level of output voltage of battery 49. Further, the voltage is indicated and visually ensured by a light emitting diode. Voltage from battery 49 is increased to 2.7 V DC by a DC—DC converter

50. Also, switching noise generated by DC—DC converter 50 is removed by a series regulator 51 and it is constructed so as not to lose the sound quality. Power from power source 210 is supplied to each circuit within the embodiment.

Figure 3A:
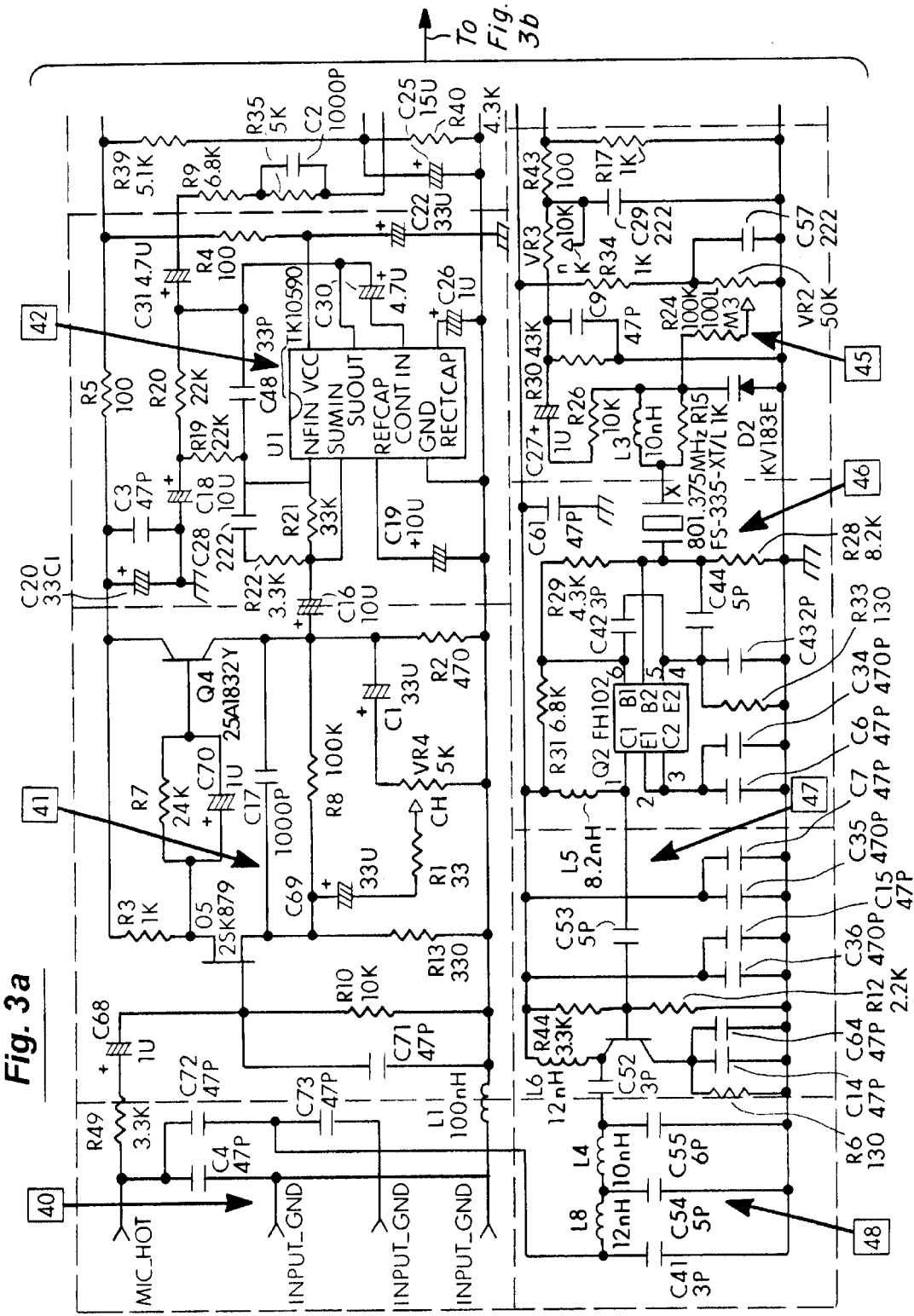
FIG. 3 shows an embodiment of a detailed circuit diagram of the transmitter device for a wireless microphone according to the invention.
Figure 3B:
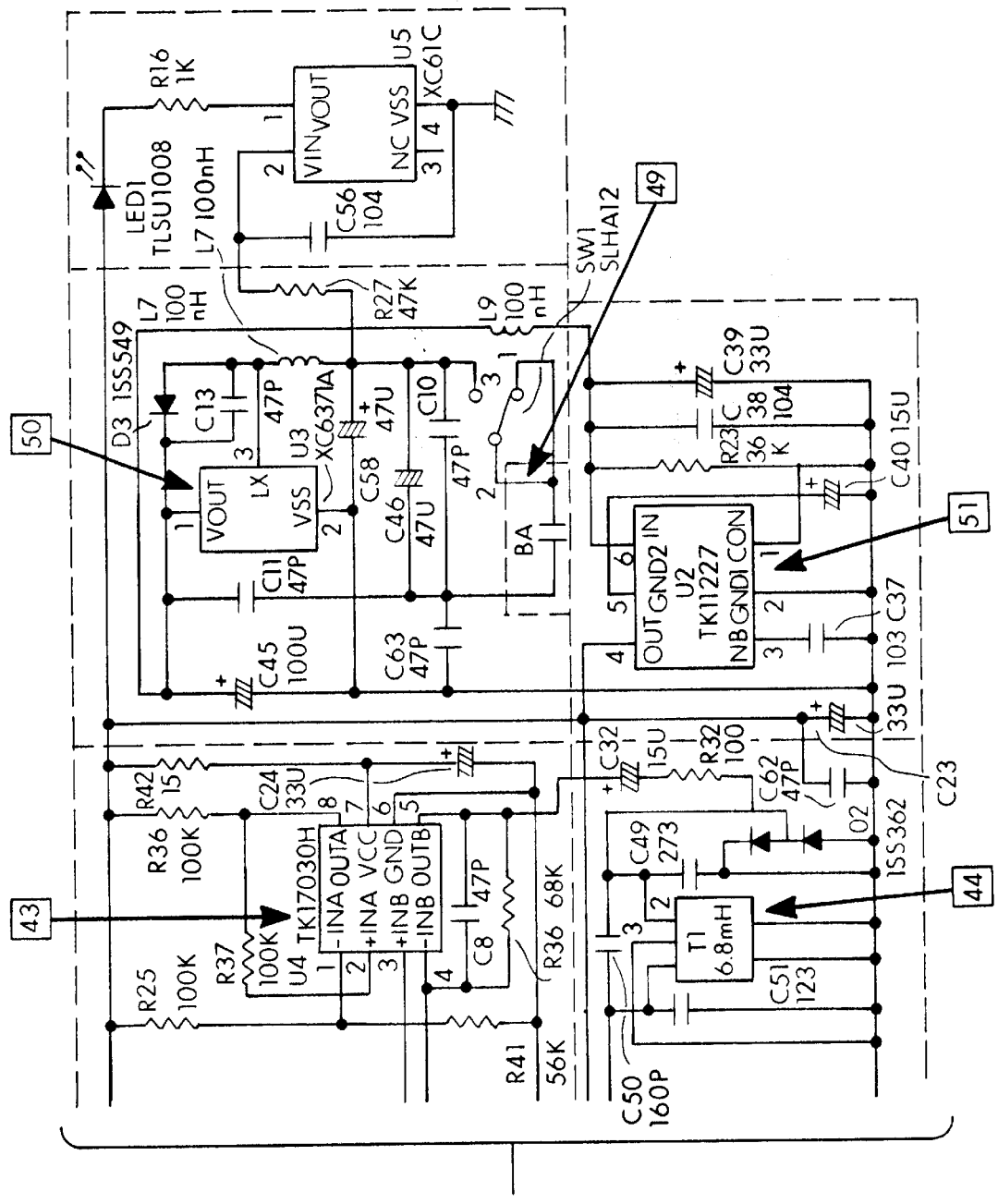

FIG. 3 shows an embodiment of a detailed circuit diagram of the transmitter device for a wireless microphone according to the invention. In FIG. 3, individual circuit configuration blocks of the transmitter described in relation to FIG. 2 are described in more detail in relation to FIG. 3.

Block 40. Microphone Terminal Input Circuit

Microphone Terminal Input Circuit 40 includes four terminals that are connected to a canon connector with 3 pins and a field ground with a connector shape. An inductor L100 and a Resistor R49 act in combination to isolate the microphone body from the transmitter. Particularly, the inductor and resistor combination provide high-frequency isolation. High-frequency power supplied from block 49 is introduced to connectors MIC-HOT and INPUT-GND for microphone connection.

Block 41. Input Amplifier Circuit

Input Amplifier Circuit 41 is a low noise amplifier with low-voltage operation. Amplifier circuit 41 is formed of an FET and a PNP transistor, and amplification is performed to the optimum input necessary for a compander. A variable resistor VR4 is pre-set. Changing variable resistor VR4 provides gain adjustment in respective microphone units. Thus, an optimal adjustment level is achievable.

Block 42. Compander Circuit

Compander Circuit 42 compresses the voice signal amplified by the input amplifier. The voice signal is compressed to ½ using a logarithmic compression. Additionally, a network of resistors and capacitors is connected to an input terminal of the compander. The network corrects middle and high pass regions of the voice signal to improve the signal-to-noise ratio in the whole system.

Block 43. Pre-Emphasis Circuit

Pre-emphasis Circuit 43 emphasizes high pass regions of the voice signal to reduce a triangular noise peculiar to FM in a comprehensive manner. In an embodiment, Pre-emphasis Circuit 43 includes a 50 μsec delay connected to an input terminal of OPAMP U4. Resistors R35 and R9 along with capacitor C2 defines the 50 μsec delay covering the high pass region.

Block 44. Audio Filter Circuit

Audio Filter Circuit 44 is a low-pass filter with a cut-off frequency of 20 KHz comprising a diode D2 for limiting inductor T1, capacitor C50, capacitor C51 and capacitor C49. Such a circuit reduces adjacent channel leakage power and improves the signal to noise ratio.

Block 45. Modulation Circuit

Modulation Circuit 45 optimizes the voice signal. Such optimization is performed and a reverse voltage is applied to the variable capacitance diode D2. Modulation circuit 45 includes variable resistors VR3 and VR2. VR3 is a pre-set resistor for adjusting modulation degree and VR2 is a pre-set resistor for controlling a DC current to a variable capacitance diode and setting a center frequency.

Block 46. Oscillation and Buffer Amplification Circuit

Oscillation and Buffer Amplification Circuit 46 includes a dual transistor connected in series to optimally use circuit current. Oscillation and Buffer Amplification Circuit 46 is operable to prevent oscillation failures in the SAW resonator by providing a negative resistance which is variable. The buffer amplification circuit is an emitter grounded amplification circuit that minimizes reflection from the antenna and the high-frequency amplification circuit.

Block 47. High-Frequency Amplification Circuit

High-frequency Amplification Circuit 47 amplifies a high-frequency signal with about 0 dBm at a frequency of 800 MHz provided from the buffer amplification circuit. Circuit 47 amplifies the received signal and outputs a high frequency signal with about +10 dBm. The amplified signal is provided to the antenna.

Block 48. Band-Pass Filter Circuit

Band-pass Filter Circuit 48 suppresses second or higher harmonic signals generated during high frequency amplification. Further, Band-pass Filter Circuit 48 matches the impedance of the antenna and a secondary π type filter for passing only a fundamental component of an 800 MHz band.

Block 49. Battery

Battery 49 is a AAA alkaline battery for supplying energy to all the transmitter circuits.

Block 50. DC—DC Converter Circuit

DC—DC Converter Circuit 50 increases the 1.5 V received from battery 49 to about 3 V. Current at the input side of about 60 mA is decreased to about 25 mA at the output side. A voltage of operation completion is 0.9 V.

Block 51. Power Stabilization and Noise Elimination Circuit

Power Stabilization and Noise Elimination Circuit 51 is a series regulator for eliminating noise created during operation of the voltage step-up DC—DC converter circuit 50. The voltage output from Circuit 51 is 2.7 V DC.

Block 52. Voltage Reduction Check Circuit

Voltage Reduction Check Circuit 52 monitors voltage output from battery 49. In addition to monitoring the voltage, Voltage Reduction Check Circuit 52 includes an alarm indicating a voltage drop. In an embodiment, the alarm comprises an LED which does not emit light when the voltage drops below 1.1 V.

Figure 4:
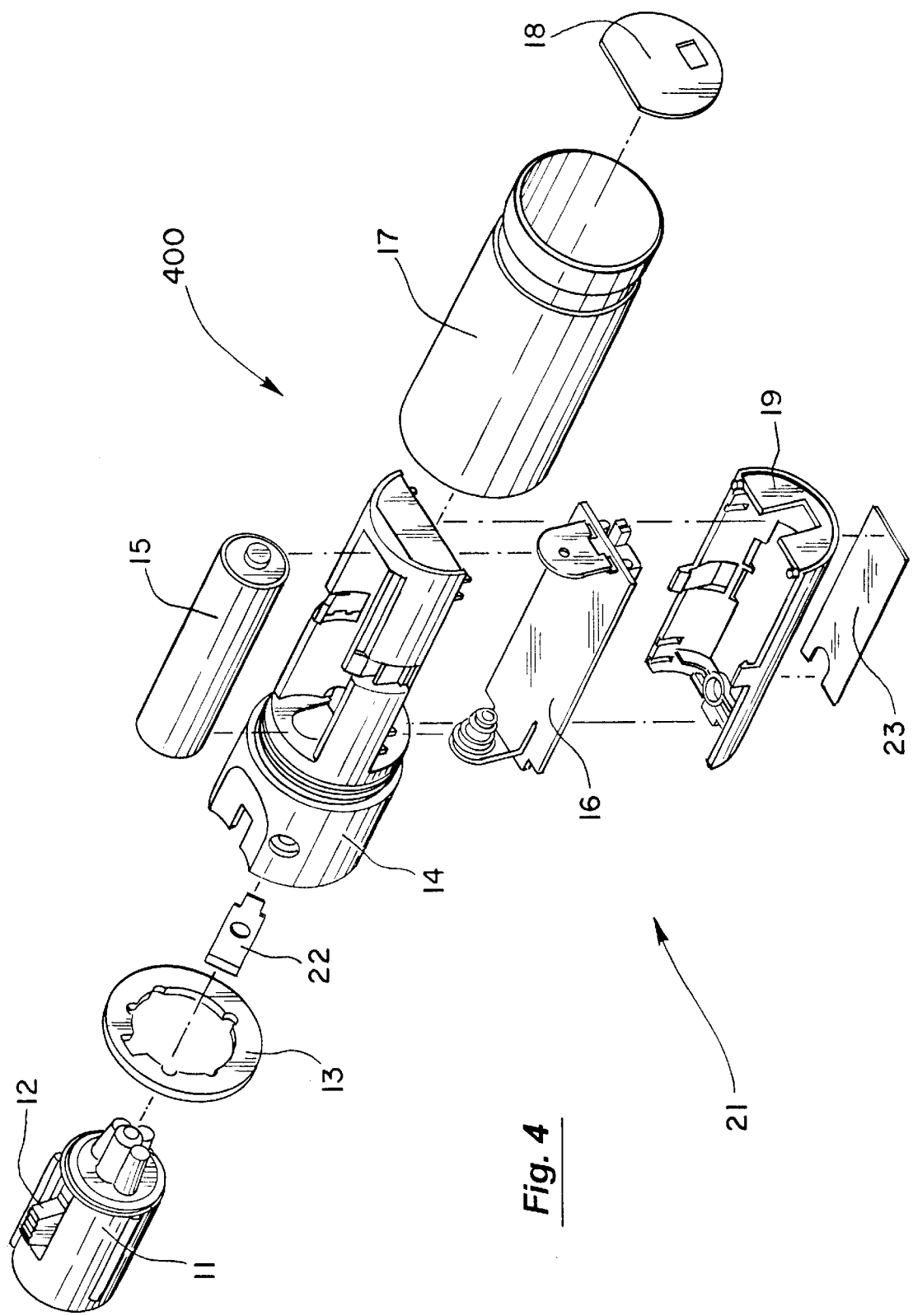
FIG. 4 shows an embodiment of a component assembly construction of the transmitter for a wireless microphone according to the invention.

Referring now to FIG. 4, an embodiment of a component assembly 400 construction of the transmitter for a wireless microphone according to the invention is illustrated. Component assembly 400 includes a canon connector 11 with XLR specifications. Connector 11 provides both mechanical and electrical connections with a microphone 31 (not shown) and a transmitter 21. Connector 11 also includes a lock mechanism 12. Component assembly 400 also includes a ring-shaped elastic member 13 comprised of rubber material. Elastic member 13 is interposed between connector 11 and transmitter 21. Elastic member 13 advantageously eliminates mechanical rattle at the interface of connector 11 and transmitter 21. By eliminating the rattle, the mutual electrical connection between cannon connector 11 and transmitter 21 is more secure.

A molded plastic module 14 is contained in a tubular body case 17. Module 14 is adapted for receiving a dry battery 15 in one side and a circuit board 16 in the opposite side. In an embodiment, circuit board 16 contains the circuitry described with reference to FIGS. 1 through 3. Circuit board 16 is protected by a plastic cover 19. A seal 23 which in some embodiments has printed letters thereon is pasted on the plastic cover. Tubular body 17 which covers plastic module 14 is made of metal. The bottom of tubular body 17 is blocked with a base plate 18.

A length of tubular body 17 is about ¼ of the wavelength of a high-frequency oscillation signal used in the embodiment. In an embodiment, the length is on the order of 75 to 90 mm. The embodiment includes an antenna structure with good radiation efficiency in which microphone body 31 is formed as an antenna and transmitter body 21 is formed as a ground.

Figure 5:
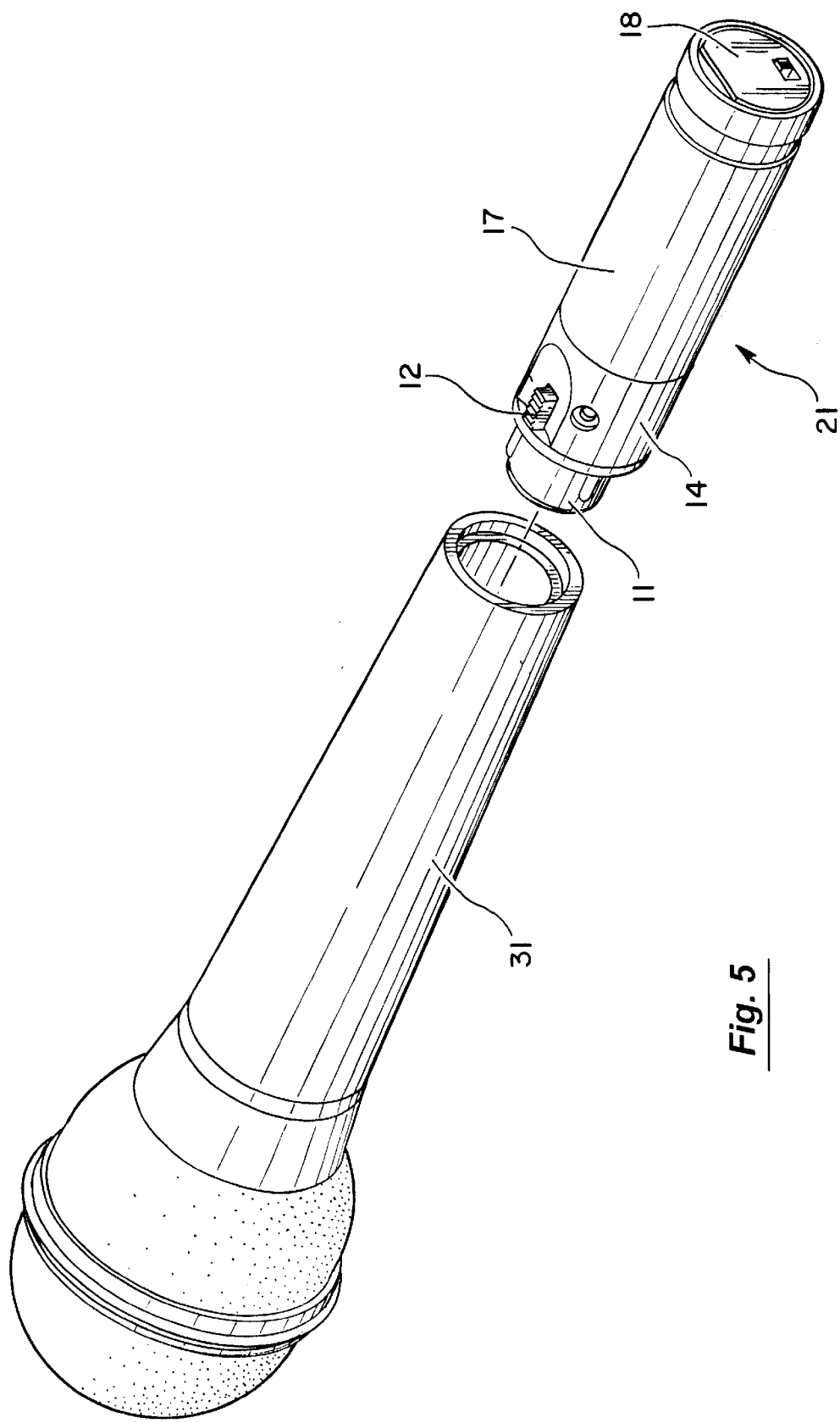
FIG. 5 shows an embodiment of a combination of the transmitter for a wireless microphone and a microphone fitted to the transmitter according to the invention.

Referring now to FIG. 5, a combination of transmitter 21 and a microphone 31 is illustrated according to the invention. As illustrated, canon connector 11 connects microphone 31 to transmitter 21. Thus, microphone 31 can easily be mounted in and removed from transmitter 21 in a snap manner. Transmitter 21 provides substantially the same shape as a wired microphone.

Figure 6:
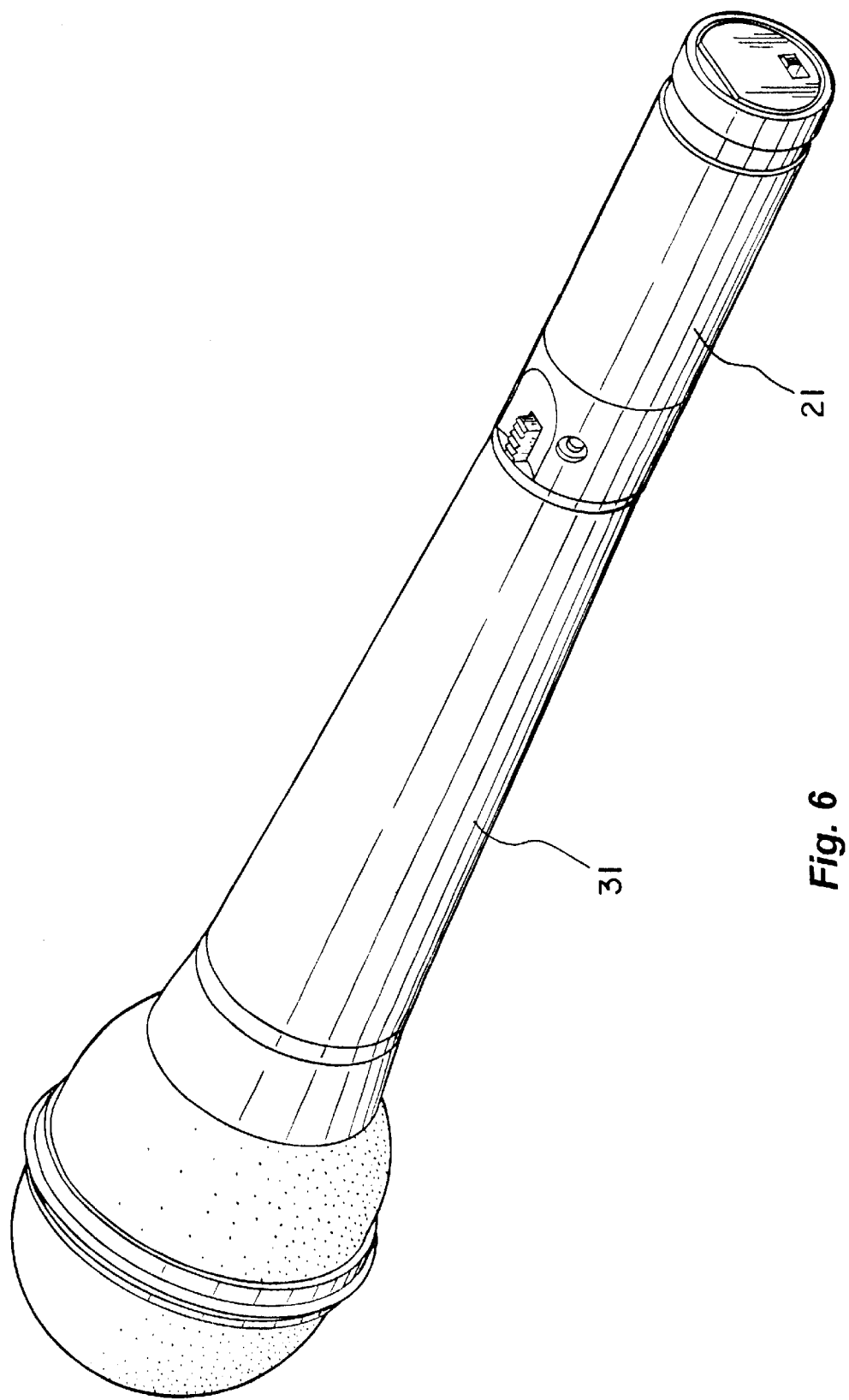
FIG. 6 shows an external view of an embodiment of a wireless microphone apparatus according to the invention.
Figure 7:
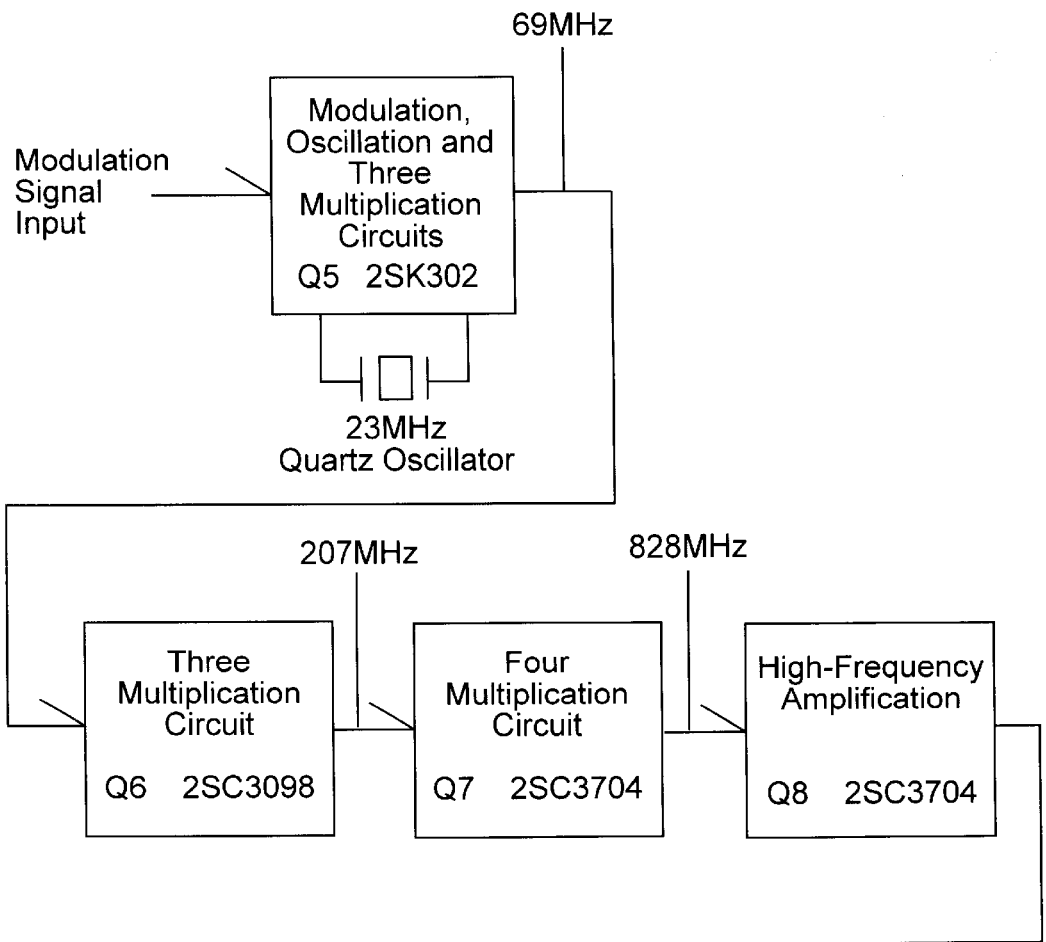
FIG. 7 shows a schematic circuit for a transmitter providing a quartz multiplication method of a conventional art.
Figure 7:
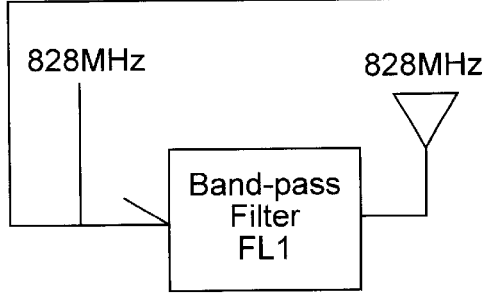
Figure 8:
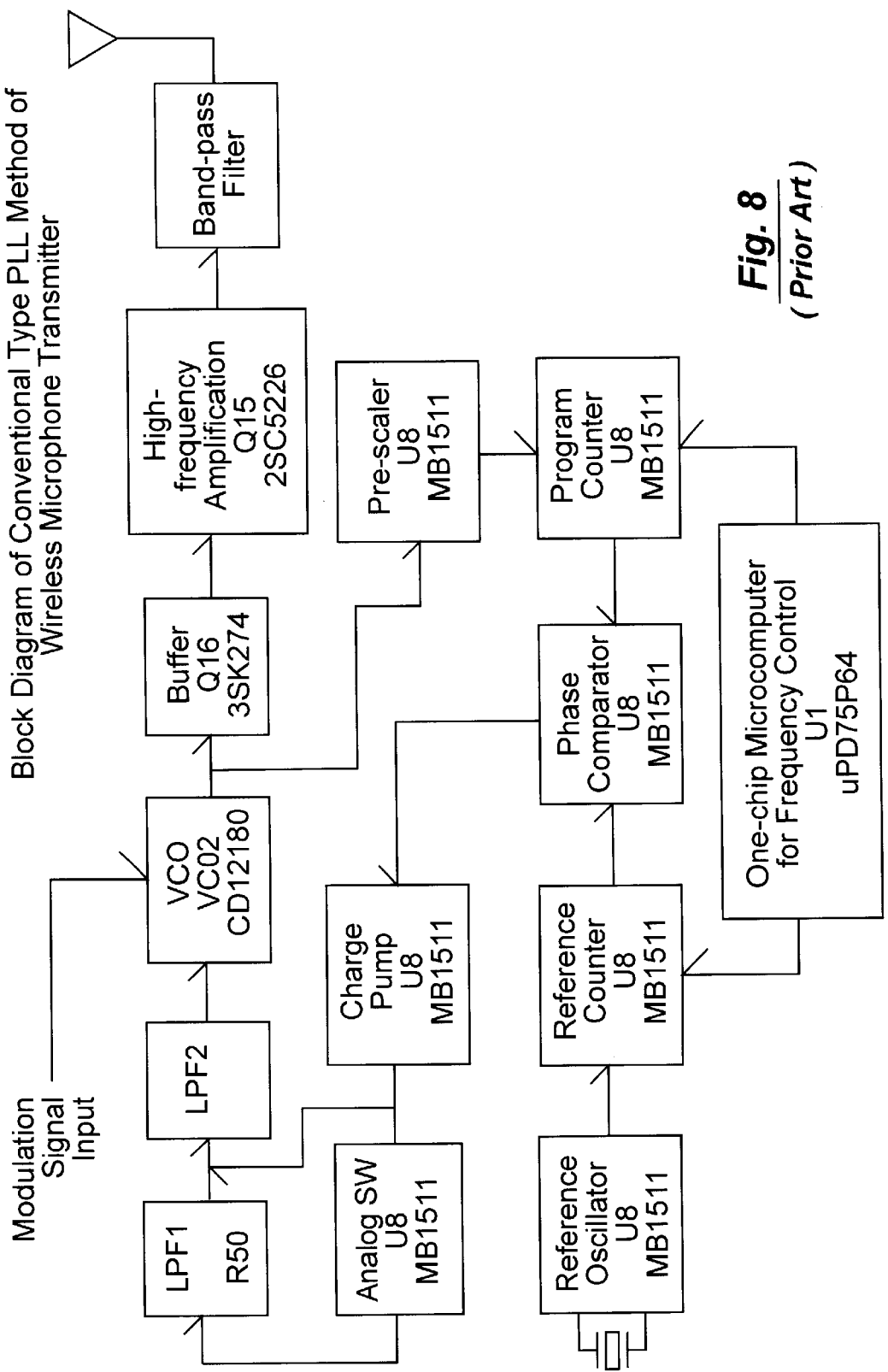
FIG. 8 shows a schematic circuit configuration of a transmitter for a wireless microphone according to a PLL method of a conventional art.

FIG. 6 illustrates an external view of a wireless microphone according to the present invention. Microphone 31 and transmitter 21 are connected through connector 11 (not shown) and form an integral outward appearance which is both compact and lightweight while maintaining functions necessary for the wireless microphone. Microphone 31 is particularly useful for business.

By improving the conventional compander part, high-frequency part, power source part, and body, transmitter 21 can be manufactured as a micro-miniature package. Such a micro-miniature package results in a compact and light weight wireless microphone and a transmitter device for the microphone with a size compatible with a canon connector (XLR).

From the foregoing discussion, a number of advantages of the present invention are evident. For example, a SAW resonator capable of directly oscillating at a frequency of 800 MHz is provided. A second advantage is that all internal component circuits including the SAW resonator modulation circuit and a pre-emphasis circuit operate at a common voltage of 2.7 V DC. Because of this, circuit current consumption is minimized. Third, a high-frequency amplification part matches the antenna and the SAW resonator. This allows for directly oscillating at a frequency in the 800 MHz band. Additionally, further unnecessary radiation is reduced by using a band-pass filter. Fourth, the antenna provided by the body case of the transmitter has a size with about ¼ the wavelength of the SAW resonator output signal. Thus, a length of 7.5 cm and the diameter of 2.3 cm are achieved. This size provides the wireless microphone with good portability as well as limited weight and size.

In addition, the present invention provides for a wireless microphone operable with a single AAA dry battery. On the single battery, the microphone can provide 10 hours or longer of continuous operation. One embodiment of the present invention has a weight, including the metal receiving case and the battery, of about 55 g.

What is claimed is:

1. A transmitter device for a wireless microphone, comprising:
   a connector operable to transfer a voice signal from a microphone to a circuit; wherein the circuit comprises:
      a low-frequency amplifier for amplifying the voice signal;
      a surface acoustic wave oscillator providing a high-frequency oscillation signal,
      a modulator for modulating the high-frequency oscillation signal by the amplified voice signal, wherein a modulated high frequency signal is created, wherein the modulator includes an oscillation element, a modulation and oscillation circuit, and a buffer amplification circuit, and wherein the voice signal is superimposed on a bias voltage created by a variable diode, the superimposed voice signal being applied to the oscillation element and being modulated by changing a load of the surface acoustic wave oscillator;
      a high-frequency amplifier for amplifying the modulated high frequency signal;
      an antenna for radiating the amplified and modulated high-frequency signal as radio waves, and
      a power supply for powering the circuit.

2. A transmitter device for a wireless microphone as defined in claim 1, further comprising:
   a compander circuit for improving a signal-to-noise ratio and increasing a dynamic range, wherein the dynamic range is increased by logarithmic compression of the voice signal, and
   a pre-emphasis circuit for reducing a signal noise, wherein the signal noise is reduced by providing a greater gain in the high frequency amplifier than in the low frequency amplifier.

3. A transmitter device for a wireless microphone as defined in claim 2, wherein the compander circuit performs ½ logarithm compression.

4. A transmitter device for a wireless microphone as defined in claim 2, wherein the surface acoustic wave oscillator outputs the high-frequency oscillation signal with a band of about 800 MHz directly without multiplication.

5. A transmitter device for a wireless microphone as defined in claim 1, wherein the surface acoustic wave oscillator outputs the high-frequency oscillation signal with a band of about 800 MHz directly without multiplication.

6. A transmitter device for a wireless microphone as defined in claim 1, wherein the high-frequency amplifier amplifies oscillation power of a band of about 800 MHz outputted from the modulator to +10 dBm with transmission output power at the antenna end of the antenna means.

7. A transmitter device for a wireless microphone as defined in claim 6, wherein a band-pass filter circuit for eliminating a harmonic noise of the high-frequency oscillation signal and matching the impedance to the antenna connected to a backend stage of the high-frequency amplifier.

8. A transmitter device for a wireless microphone as defined in claim 7, wherein a body case of the transmitter device serves as the antenna and the body case has a size with about ¼ the wavelength of the high-frequency oscillation signal.

9. A transmitter device for a wireless microphone as defined in claim 1, wherein the power supply comprises a battery and a direct current to direct current converter for increasing an output voltage of said battery, and wherein each element of the circuit operates at the voltage provided by the direct current to direct current converter.

10. A transmitter device for a wireless microphone as defined in claim 9, wherein the battery is one AAA size dry cell battery providing greater than 10 hours of continuous operation.

11. A wireless microphone apparatus comprising:
   a microphone for receiving a voice signal, and a wireless transmitter connected to said microphone by a connector, the wireless transmitter comprising:
      a low-frequency amplifier for amplifying the voice signal,
      a surface acoustic wave oscillator for outputting a high-frequency oscillation signal;
      a modulator for combining the high-frequency oscillation signal and the amplified voice signal to form a modulated signal, wherein the modulator includes an oscillation element and a buffer amplification circuit, wherein the voice signal is superimposed on a bias voltage and applied to the oscillation element, and wherein the voice signal is modulated by changing a load of the surface acoustic wave oscillator which is inserted into a base terminal of the oscillation element;

a high-frequency amplifier for amplifying the modulated signal to create a high frequency modulated signal;

an antenna means for radiating the high frequency modulated signal as radio waves, and a power supply, wherein power from the power supply is distributed to the transmitter.

12. A wireless microphone apparatus as defined in claim 11, the apparatus further comprising:

a compander circuit for improving a signal-to-noise ratio and increasing a dynamic range of the voice signal, wherein the dynamic range is increased by logarithmic compression of the voice signal; and a pre-emphasis circuit for reducing a noise by making an amplification degree of a high-pass frequency in the voice signal larger than that of other frequency regions.

13. A wireless microphone apparatus as defined in claim 12, wherein the surface acoustic wave oscillation means outputs the high-frequency oscillation signal with a band of about 800 MHz directly without multiplication.

14. A wireless microphone apparatus as defined in claim 12, wherein the compander circuit performs ½ logarithm compression.

15. A wireless microphone apparatus as defined in claim 11, wherein the high-frequency amplification means amplifies oscillation power of a band of 800 MHz outputted from the modulation means to +10 dBm with transmission output power at the antenna end of the antenna.

16. A wireless microphone apparatus as defined in claim 15, further comprising a band-pass filter circuit for eliminating a harmonic noise of the high-frequency oscillation signal and for matching the impedance to the antenna connected to a backend stage of the high-frequency amplification means.

17. A wireless microphone apparatus as defined in claim 16, wherein a body case of said transmitter device serves as the antenna, the body case having a length of about ¼ the wavelength of the high-frequency oscillation signal.

18. A wireless microphone apparatus as defined in claim 11, wherein the surface acoustic wave oscillator outputs the high-frequency oscillation signal with a band of about 800 MHz directly without multiplication.

19. A wireless microphone apparatus as defined in claim 11, wherein the power supply comprises a battery and a DC—DC converter for increasing an output voltage of said battery, and wherein each of the elements of the transmitter operate at the same voltage.

20. A wireless microphone apparatus as defined in claim 19, wherein the battery is a AAA dry battery providing 10 hours or longer of continuous operation of the transmitter.

21. A wireless microphone apparatus as defined in claim 11, wherein the microphone is fitted and connected to the wireless transmitter through a non-conductive elastic member, wherein the elastic member maintains electrical and mechanical connections between the connector and the transmitter.

* * * * *